Figure 1:
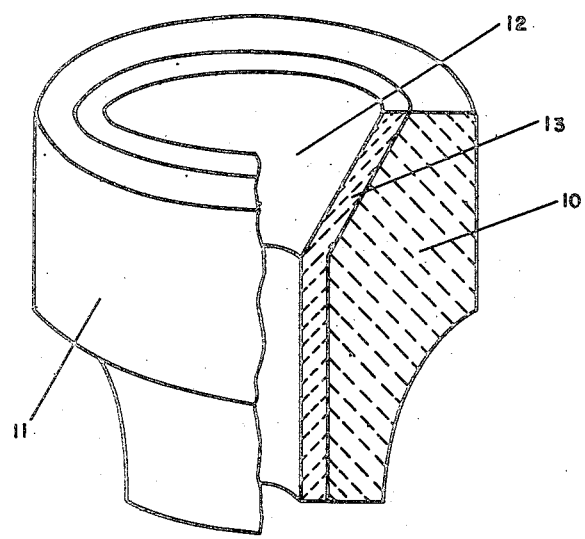

Dec. 19, 1950  C. R. AUSTIN ET AL  2,534,653
METHOD OF MAKING COMPOSITE REFRACTORY
Filed June 10, 1946

INVENTORS
Chester R. Austin
Henry Z. Schofield

By

*Hurst, Hudson, Boughton & Williams*

Attorneys

Patented Dec. 19, 1950

2,534,653

UNITED STATES PATENT OFFICE 2,534,653

METHOD OF MAKING COMPOSITE REFRACTORY

Chester R. Austin and Henry Z. Schofield, Columbus, Ohio, assignors, by mesne assignments, to The Ferro Engineering Company, Cleveland, Ohio, a corporation of Ohio Application June 10, 1946, Serial No. 675,669

9 Claims. (Cl. 25—156)

This invention relates to improvements in refractories and it has to do primarily with a method of producing composite refractories comprising a relatively massive body section and a surface layer of different composition. The invention is particularly applicable, for example, to the production of a composite refractory nozzle, for pouring or teeming molten materials, having a lined bore and/or seat section.

The production of composite refractories has presented many difficulties. As an example, this problem may be illustrated by the production of a composite refractory nozzle having a body portion composed primarily of a refractory other than zirconium silicate with the seat and bore sections thereof lined with a refractory composition composed predominantly of zirconium silicate, as disclosed and claimed in the copending application of Chester R. Austin, Serial No. 675,667, filed of even date herewith, now abandoned.

In the production of such a composite refractory, the body portion may be formed of the desired composition in any desired manner, such as by pressing or by casting, and subsequently dried. In the same way, a liner may be separately formed, for example, by slip casting, and after drying, inserted in the body portion and fired. In such a process, however, considerable difficulty is encountered in developing the desired bond between the two sections, and cracking often develops.

Some of these difficulties may be circumvented by a multiple-mold slip-casting process in which the lining composition is prepared as a suitable slip, poured into a nonabsorbent mold, and allowed to stand until the desired lining thickness is built up around an absorbent internal core. The excess lining slip is then drained out of the nonabsorbent mold; an absorbent mold conforming to the exterior surface of the final composite body is substituted therefor; a slip comprising the body composition is poured into the porous mold and allowed to set until solid. The composite refractory is then dried and fired in accordance with usual practice. Such a process is capable of producing well-bonded composite refractories having excellent properties; however, the process is time-consuming and requires a large number of complex and expensive molds.

It is, therefore, a primary object of this invention to provide an improved process for the production of composite refractories.

A further object of this invention is to provide a method of producing composite refractories that is rapid and that does not require a large number of expensive molds.

Another object is to provide an improved, rapid, and economical method for the production of well-bonded composite refractories.

Still another object is to provide an improved process for the production of composite refractory nozzles having a seat and/or bore section lined with a material composed predominantly of zirconium silicate.

Figure 2:
Figure 2:
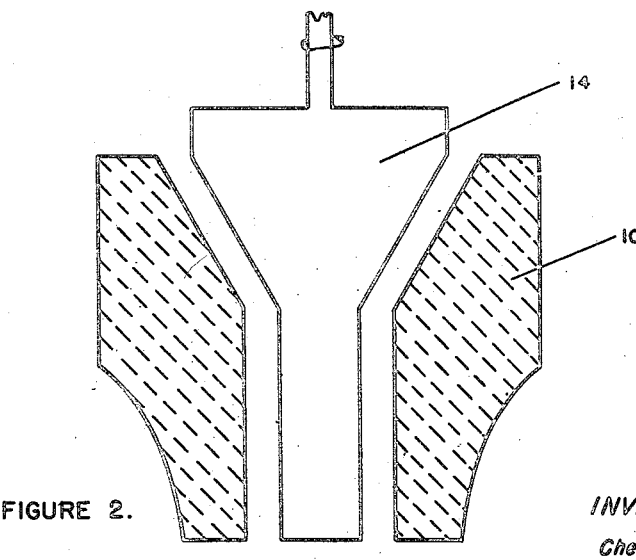

Other and further objects and advantages of this invention will become apparent from the following detailed description thereof when read in conjunction with the accompanying drawing, in which Figure 1 represents an isometric view, partly in cross-section, of a composite refractory nozzle as one example of a composite refractory shape produced in accordance with the present invention, and Figure 2 illustrates one specific adaptation of the process in which the lining composition is spun into place, or formed by a rotating tool, by a modified pressing operation.

In general, the present invention is based upon the discovery that composite refractory shapes can be readily and economically produced by a process in which the body portion is formed from a moist refractory composition, as by a pressing operation, and then the lining material is subsequently spun into place. By this process, the expense of porous molds may be eliminated and production may be greatly accelerated.

This particular process may be illustrated by reference to the accompanying drawing. Figure 1 represents one specific example of a composite refractory nozzle produced in accordance with this invention. In this particular example, the body portion 10 of nozzle 11 is produced in a manner well known in the art, for example, by pressing in suitable dies a soft blank of the desired composition cut from an extruded slug. The internal cavity 12 is then lined to the desired thickness by a spinning process with a refractory 13 of a different composition, and the composite refractory is dried and fired, developing the desired bond between the two refractory compositions.

Figure 2 shows one specific means of forming the refractory lining. In this particular adaptation, an excess quantity of the lining composition, having a soft-mud consistency, is placed in the cavity of the pressed body portion 10 and spun into position by means of a revolving arbor 14 having dimensions conforming with the desired internal shape of the completed nozzle and mounted in a conventional manner (not shown)

so that it may be rotated and simultaneously either introduced into or removed from the cavity of the pressed body. In practice, it has been found desirable to lubricate the surface of the revolving arbor with a light machine oil or similar lubricant.

As an alternative procedure, the lining may be spun into position by jiggering. In this procedure, the revolving arbor is replaced by a knife-edge or profile conforming to the desired internal shape of the completed nozzle, and the nozzle body is revolved about its axis of symmetry to spin the lining composition into position.

In the case of composite refractories for use at relatively high temperatures, such as a composite nozzle, some difficulty has been encountered in developing the required bond between the body and liner sections. It has been found that this difficulty may be completely overcome by moistening the surface of the pressed body just prior to the application of the spun liner. Although plain water has been found satisfactory for most applications, even better results may be obtained through the use of an aqueous solution of a ceramic flux, such as compounds of the alkali and alkaline earth metals and boron. For example, aqueous solutions of sodium chloride, calcium chloride, sodium silicate, and borax have been found to produce excellent results. In practice, a swab saturated with water or with the flux solution may be wiped over the surface to be lined, producing a wet film on this surface; the lining material is then immediately spun into place; and the composite refractory is then dried and burned to the desired temperature.

The choice of refractory compostions for the body and lining portions of the composite refractory will depend, of course, upon the particular application involved. Nearly any refractory composition can be suitably prepared for pressing or for spinning. In the production of composite refractory nozzles, for example, utilizing a lining composed predominantly of zirconium silicate, the body portion may be composed of a refractory clay, such as fire clay, kaolin, or ball clay, or of a refractory material such as calcined kyanite, chromite, or magnesia. These refractory materials may also be used in conjunction with various plastic clays and other binders to facilitate the pressing operation. The exact amount of water required will depend primarily upon the pressing conditions; however, between 10 and 20% has been found generally desirable for use in this process, with about 15% preferred for most refractory mixes investigated. The lining materials should contain at least about 70% of zirconium silicate, on a dry basis, and preferably at least 85%. Minor amounts of plastic clay and other materials may be added to improve the workability and dry strength of the resultant body. Sufficient water is added to give a soft-mud consistency.

In one particular adaptation of this process, a composite refractory nozzle was produced by pressing a body portion from a refractory mixture composed of 24% Georgia kaolin from the United Clay Mines Corporation, 6% C and C ball clay from the H. C. Spinks Clay Company, and 70% crushed Ironton fire brick, to which about 16% of water had been added. This mixture was extruded through a de-airing extrusion machine and pressed to the desired shape in a steel die. The surface to be lined was moistened with a concentrated solution of sodium chloride, and a lining composed of 10% Georgia kaolin, 5% C and C ball clay, and 85% of zirconium silicate, to which 0.5% of cereal flour and sufficient water to produce a soft-mud consistency were added, was spun into place. The composite nozzle was then allowed to air-dry for approximately three hours, and it was then dried in an oven at 180° F. After drying, it was burned to about 2500° F. in approximately 25 hours and held at this temperature for about four hours. There was no cracking or other evidence of an imperfect bond.

In the foregoing examples, and in the appended claims, all percentages are given as per cent by weight.

From the foregoing description, it will be evident that the present invention relates to a process for forming a composite refractory in which a body portion is pressed from the desired refractory composition and a lining portion of the desired composition is spun into place. An improved bond may be produced between the two refractory compositions by moistening the surface of the body section, preferably with an aqueous solution of a ceramic flux, prior to the spinning of the lining portion. By the use of this process, expensive molds may be eliminated and production is facilitated.

Modifications and variations of the present invention as above-described will become apparent to those skilled in the art, and such alterations as may be included within the scope of the hereafter-appended claims are considered as constituting a part of the present invention.

What is claimed is:

1. The method of producing a composite refractory nozzle having a body portion and a liner portion in the seat and bore sections thereof which comprises pressing a body section from a refractory composition composed predominantly of fire clay, moistening the surface to be lined with a concentrated solution of sodium chloride, spinning into position a lining composed of at least 85% zirconium silicate while maintaining accurate internal dimensions by means of a revolving arbor, and subsequently drying and firing the composite refractory.

2. In the production of a composite refractory comprising a body section and a refractory lining intimately bonded together, the steps of forming the body section from a moist refractory composition, applying a moistening agent to the internal surface of the body section, applying in situ by a spinning process a lining of a soft mud consistency, and subsequently drying and firing the composite refractory.

3. In the production of a composite refractory comprising a body section and a refractory liner, the steps of pressing the body section from a moist refractory composition, moistening the surface to be lined with a concentrated solution of sodium chloride, and spinning said liner into position.

4. In the production of a composite refractory comprising a body section and a refractory liner, the steps of pressing the body section from a moist refractory composition, moistening the surface to be lined with an aqueous solution of a ceramic flux, and spinning said liner into position.

5. In the production of a composite refractory comprising a body section and a refractory liner, the steps of forming the body section from a moist refractory composition composed predominantly of a refractory clay and containing from about 10 to about 20% of water, moistening the surface to be lined with an aqueous solution of a ceramic flux, and spinning into position a lining composed predominantly of zirconium silicate.

6. The method of producing a composite refractory nozzle having a body portion and a liner portion which comprises pressing a body section from a refractory composition composed predominantly of a refractory clay, moistening the surface to be lined with an aqueous solution of a ceramic flux, spinning into position a lining composed predominantly of zirconium silicate, and subsequently drying and firing the composite refractory.

7. The method of producing a composite refractory nozzle having a body portion and a liner portion in the seat and bore sections thereof, which comprises forming a body section from a refractory composition composed predominantly of a refractory clay, moistening the surface to be lined with an aqueous solution of a ceramic flux, spinning into position a lining composed predominantly of zirconium silicate, and subsequently drying and firing the composite refractory.

8. The method of producing a composite refractory nozzle having a body portion and a liner portion in the seat and bore sections thereof which comprises pressing a body section from a refractory composition composed predominantly of fire clay, moistening the surface to be lined with a concentrated solution of sodium chloride, spinning into position a lining composed of at least 85% of zirconium silicate, drying the composite refractory, and subsequently firing it at a temperature in excess of 2000° F.

9. The method of producing a composite refractory nozzle having a body portion and a liner portion in the seat and bore sections thereof, which comprises pressing a body section from a moist refractory composition composed predominantly of a refractory clay, applying a moistening agent to the internal surface of the body portion, spinning into position a lining composed predominantly of zirconium silicate, and subsequently drying and firing the composite refractory.

CHESTER R. AUSTIN.
HENRY Z. SCHOFIELD.

REFERENCES CITED

The following references are of record in the file of this patent:

UNITED STATES PATENTS

| Number | Name | Date |
|---|---|---|
| 1,400,489 | Lowry | Dec. 13, 1921 |
| 1,609,427 | Queneau | Dec. 7, 1926 |
| 1,612,916 | Gorton | Jan. 4, 1927 |
| 1,630,762 | Randall | May 31, 1927 |
| 1,675,119 | Marden | June 26, 1928 |
| 1,754,838 | Showers | Apr. 15, 1930 |
| 2,067,716 | Landow | Jan. 12, 1937 |
| 2,303,304 | Schleicher | Nov. 24, 1942 |